G. WRIGHT.
HOES.
No. 177,311. Patented May 9, 1876.
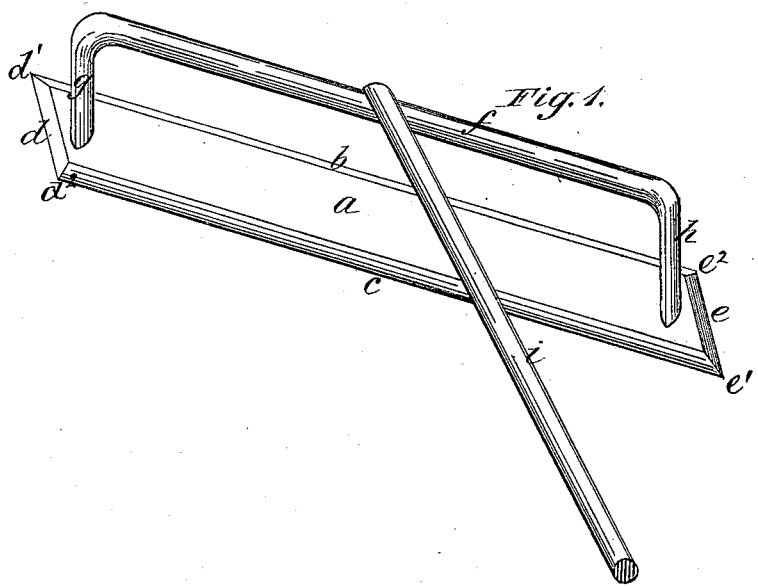
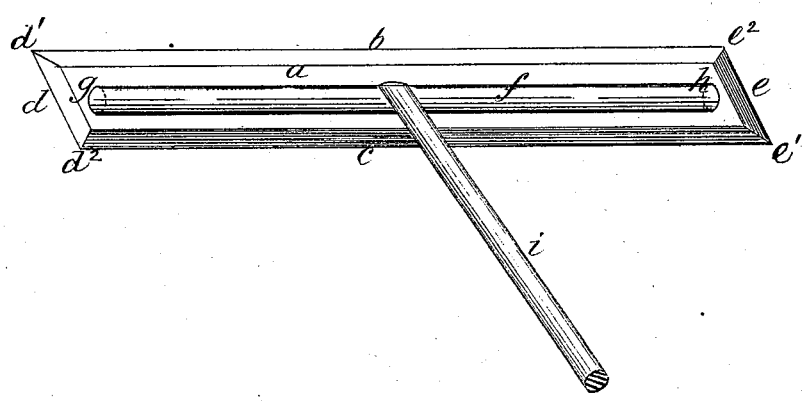
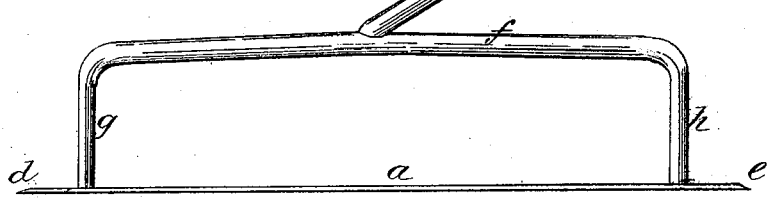
Witnesses:
Inventor:
Grove Wright
by Johnson and Johnson
Att'ys.

UNITED STATES PATENT OFFICE.

GROVE WRIGHT, OF ROCK FALLS, ILLINOIS.

IMPROVEMENT IN HOES.

Specification forming part of Letters Patent No. 177,311, dated May 9, 1876; application filed October 7, 1875.

*To all whom it may concern:*

Be it known that I, GROVE WRIGHT, of Rock Falls, in the county of Whitesides and State of Illinois, have invented certain new and useful Improvements in Hoes; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to produce a neat and convenient hoe, which shall be light and simple, and of such form and so arranged that weeds and grass may be readily cut between rows of plants and between the plants in the rows at the same time with great facility and ease. The invention consists principally in the particular configuration of the hoe-blade and the relative position in which the handle is arranged and attached thereto. It also consists in other details of construction hereinafter more fully set forth in the claims.

In the accompanying drawings, Figure 1 is a perspective view of my hoe. Fig. 2 is a top view, showing the form of the blade and position of the handle attached thereto; and Fig. 3 is a side view.

The blade $a$ is made of a thin piece of steel, and is somewhat narrow, having parallel sides $b$ $c$, as shown; each of these sides, which may be termed the front and rear, are made sharp for cutting the weeds, and are beveled upon the upper side, so that the lower face is left perfectly flat. The ends of the blade $d$ and $e$ are brought to acute angles, one projecting forward and the other backward, or to the rear, for the purpose of working between plants that are near to each other or working around a plant. The blade ends also form obtuse angles $d^2$ $e^2$, which are also arranged front and rear, and terminate in the long parallel sides $b$ $c$. These ends are sharpened like the sides $b$ $c$, by being beveled upon the upper side. Attached to this blade $a$, near each end, is a yoke or shank, $f$, which arches over the blade longitudinally, and prevents it from springing, and subserves the further office of permitting the cut weeds or lumps of soil to pass under it and over the blade when in operation, and its outer vertical ends $g$ $h$ serve as guides to prevent the blade, which is hidden in the soil, from being brought against the plants while the hoe is in operation, and thereby cutting the plants. This yoke may be bolted, welded, riveted, or in any other manner fastened to the hoe-blade. The vertical or turned-down ends $g$ $h$ are each flattened or made oval with sharp front and rear edges, whereby the lodgment of weeds and other substances which might obstruct the operation of the hoe is prevented. To the horizontal part of the yoke, and midway thereof, is secured the handle $i$, which projects rearward at a horizontal or sidewise oblique angle to the blade and yoke, and somewhat upward. Thus it will be seen that the handle can rest in the operator's hands while the blade will rest perfectly level on or in the soil; or, if desired, the hoe can be made to stand at an angle to the soil by depressing the handle. The hoe is to be used principally as a hand-cultivator for working between rows of plants, or among the plants themselves, upon either the right or left of the space between the rows, and is forced forward and backward in a shuffling manner, cutting the weeds and loosening the soil both upon the forward and backward movement. In consequence of the narrowness of the blade it can be brought between plants that are situated very near together, and be operated conveniently, while the acute oppositely-projecting points can be made to reach almost every corner and position that can be imagined, and remove the weeds and handle the soil with great ease. The sidewise-oblique angle in which the handle is situated to the two-edged blade gives the latter a drawing-cut whether it is pushed or drawn, which causes it to work easily in hard soil, cut weeds and grass with ease, and keeps the edges from becoming foul. As the blade is long and narrow, it can be worked on an uneven surface to advantage, and, if desired, made to take a wide sweep of surface at each forward or backward stroke or movement. The arching form of the yoke makes the whole device firm, and prevents flexibility of the blade and handle, while the flattened turned-down ends not only prevent weeds from catching upon them, but cause the hoe-blade to be drawn through the soil with less obstruction. The various ways in which this hoe can be handled to cut grass and weeds in working around the plants, and in loosening and removing soil, it is deemed unnecessary to explain further than has already been referred to.

I am aware that hoes have been made of many forms and with all sides sharpened, but I am not aware that such a hoe as mine, possessing the many advantages herein enumerated, has ever been produced. I am aware that a long hoe-blade, with front and rear cutting-edges, secured to a yoke by vertical end arms, is not new, but the features which distinguish my invention from such a hoe consist in the combination with a hoe having parallel front and rear cutting-edges of cutting ends forming acute angles therewith, one having a front and the other a rear point. The cutting-edges of the yoke-arms, in connection with a blade of such construction, is also a new element, while the combination, with such a blade, of a handle having a compound angle in relation to such blade and the yoke forms a novel feature, and these several points of improvement have singularly and collectively advantages of great utility in such an implement. I further disclaim a rhomboidal-shaped hoe blade, having cutting-edges on all sides, as my improvement is essentially different from such a construction.

I claim—

1. The flat narrow hoe-blade, having its ends $d\ e$ forming both acute and obtuse angles $d^1\ e^1\ d^2\ e^2$, standing front and rear alternately, and forming the points $d^1\ e^1$ of the long parallel cutting-edges, the point of one end being in front and the point of the other in rear, and combined with the handle $i$ and the yoke $f$, as described.

2. The hoe, consisting of the flat narrow blade, the ends $d\ e$ of which form both acute and obtuse angles $d^1\ e^1\ d^2\ e^2$, with their points $d^1\ e^1$ standing front and rear, and terminating in the long parallel cutting-edges $b\ c$, in combination with a handle, $i$, having both an upward and a sidewise oblique inclination to said blade, in the manner and for the purpose herein set forth.

In testimony that I claim the foregoing, I have affixed my signature in presence of two witnesses.

GROVE WRIGHT.

Witnesses:
   J. B. RALPH,
   GEORGE ADAIR.